US008036356B1

(12) United States Patent
Ghosh et al.

(10) Patent No.: US 8,036,356 B1
(45) Date of Patent: Oct. 11, 2011

(54) SYSTEM AND METHOD OF IDENTIFYING GEOGRAPHIC LOCATION FOR THE SOURCE OF A CALL

(75) Inventors: Arpan Ghosh, Parsippany, NJ (US); David Mohler, Arvada, CO (US); Mary Elise Ricker, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1464 days.

(21) Appl. No.: 11/500,563

(22) Filed: Aug. 8, 2006

(51) Int. Cl.
*H04M 1/56* (2006.01)
*H04M 15/06* (2006.01)

(52) U.S. Cl. ........... 379/142.1; 379/114.14; 379/142.17; 379/145; 379/207.15; 379/245

(58) Field of Classification Search .............. 379/88.19, 379/88.2, 88.21, 93.23, 142.01, 142.06, 142.09, 379/142.1, 142.17, 207.15, 245, 247, 114.14
See application file for complete search history.

(56) References Cited

U.S. PATENT DOCUMENTS

| 5,771,283 | A | * | 6/1998 | Chang et al. ............. 379/142.01 |
| 5,832,072 | A | * | 11/1998 | Rozenblit ..................... 379/246 |
| 5,982,867 | A | * | 11/1999 | Urban et al. ............. 379/201.01 |
| 6,205,213 | B1 | * | 3/2001 | Kucmerowski et al. . 379/142.01 |
| 6,233,329 | B1 | * | 5/2001 | Urban et al. ............... 379/142.1 |
| 6,324,272 | B1 | * | 11/2001 | Abu-Shukhaidem et al. ........................ 379/142.06 |
| 6,353,664 | B1 | * | 3/2002 | Cannon et al. ............. 379/142.1 |
| 6,963,557 | B2 | * | 11/2005 | Knox .............................. 370/352 |
| 2002/0159442 | A1 | * | 10/2002 | Quigley et al. ................ 370/352 |
| 2003/0063731 | A1 | * | 4/2003 | Woodring ................ 379/207.15 |
| 2007/0195942 | A1 | * | 8/2007 | Woodring ................ 379/207.15 |

* cited by examiner

*Primary Examiner* — Binh Tieu
(74) *Attorney, Agent, or Firm* — Chapin IP Law, LLC; David W. Rouille, Esq.

(57) ABSTRACT

A method, apparatus and computer program product for identifying a geographic location for a source of a call is presented. A central office receives a call from a calling party, the call including a telephone number of the calling party. A geographic location of the calling party is determined from information associated with the calling party. The geographic location is then provided to the called party.

21 Claims, 3 Drawing Sheets

SYSTEM AND METHOD OF IDENTIFYING GEOGRAPHIC LOCATION FOR THE SOURCE OF A CALL

BACKGROUND

Incoming Caller Line IDentification (ICLID) is an analog service offered by a central office exchange that transmits the calling party's telephone number to the called party's telephone equipment. ICLID type 1 provides the calling party's telephone number via modem bursts between the first and second ringing cycle and ILCID type 2 provides the calling party's telephone number in the same way while the called party is currently engaged in another call. ICLID is the typical service offered to a residential customer. ICLID is part of the Custom Local Area Signaling Services (CLASS), and can also provide the date and time of the call.

SUMMARY

Conventional mechanisms such as those explained above suffer from a variety of deficiencies. One such deficiency is that while conventional Incoming Caller Line IDentification (ICLID) systems can provide the subscriber (called party) with the name and number of the incoming call (calling party), present ICLID methods allow suppression of the name/number field leaving the called party without any useful information on many occasions from these services. Not only is the suppression of the name and number frustrating to the party subscribing to the ICLID service because it prevents useful call screening, it is a major reason for a lower service "take rate" and for customers dropping the service. A variety of potentially undesirable callers suppress the name and number fields within ICLID to avoid warning the called party.

Embodiments of the invention significantly overcome such deficiencies and provide mechanisms and techniques that provide the geographic location of the calling party. The presence of the geographic location could help determine if the call is undesirable. An example of a call that may be undesirable is one from a call center that is disturbing the called party to offer goods or services (a solicitor) who would normally have caller ID functions blocked. By providing a geographic location of the calling party, without revealing the identity of the calling party, the called party could determine whether they know anyone at the geographic location of the party that is calling. While this does not fully replace the presence of ICLID information, it can help remind the called party who they know at a particular geographic area.

Accordingly, there is a need in ICLID systems to provide specific information regarding where the call is originating from where the information cannot be blocked by the calling party and which does not compromise the privacy of the calling party. Thus, in such a situation, the true identity of the geographic location of the calling individual would be of significant value in the called party's decision whether or not to accept an incoming call. This is especially true if the ICLID information has been suppressed. Additionally, a number of enhancements are possible once the geographic location is known.

In a particular embodiment of a method of identifying a geographic location for a source of a call, the method includes receiving at a central office a call from a calling party, the call including a telephone number of the calling party. The method further includes determining from information associated with the calling party, a geographic location of the calling party; and providing the geographic location to the called party.

Other embodiments include a computer readable medium having computer readable code thereon for identifying a geographic location for a source of a call, the medium comprising instructions for receiving, at a central office, a call from a calling party, the call including a telephone number of the calling party. The computer readable medium further includes instructions for determining from information associated with the calling party, a geographic location of the calling party. The computer readable medium also includes instructions for providing the geographic location to the called party.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for identifying a geographic location for a source of a call as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations product is one embodiment that has a computer-readable medium including computer program logic encoded thereon that when performed in a computerized device provides associated operations for identifying a geographic location for a source of a call as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the inven

DETAILED DESCRIPTION

Figure 1:
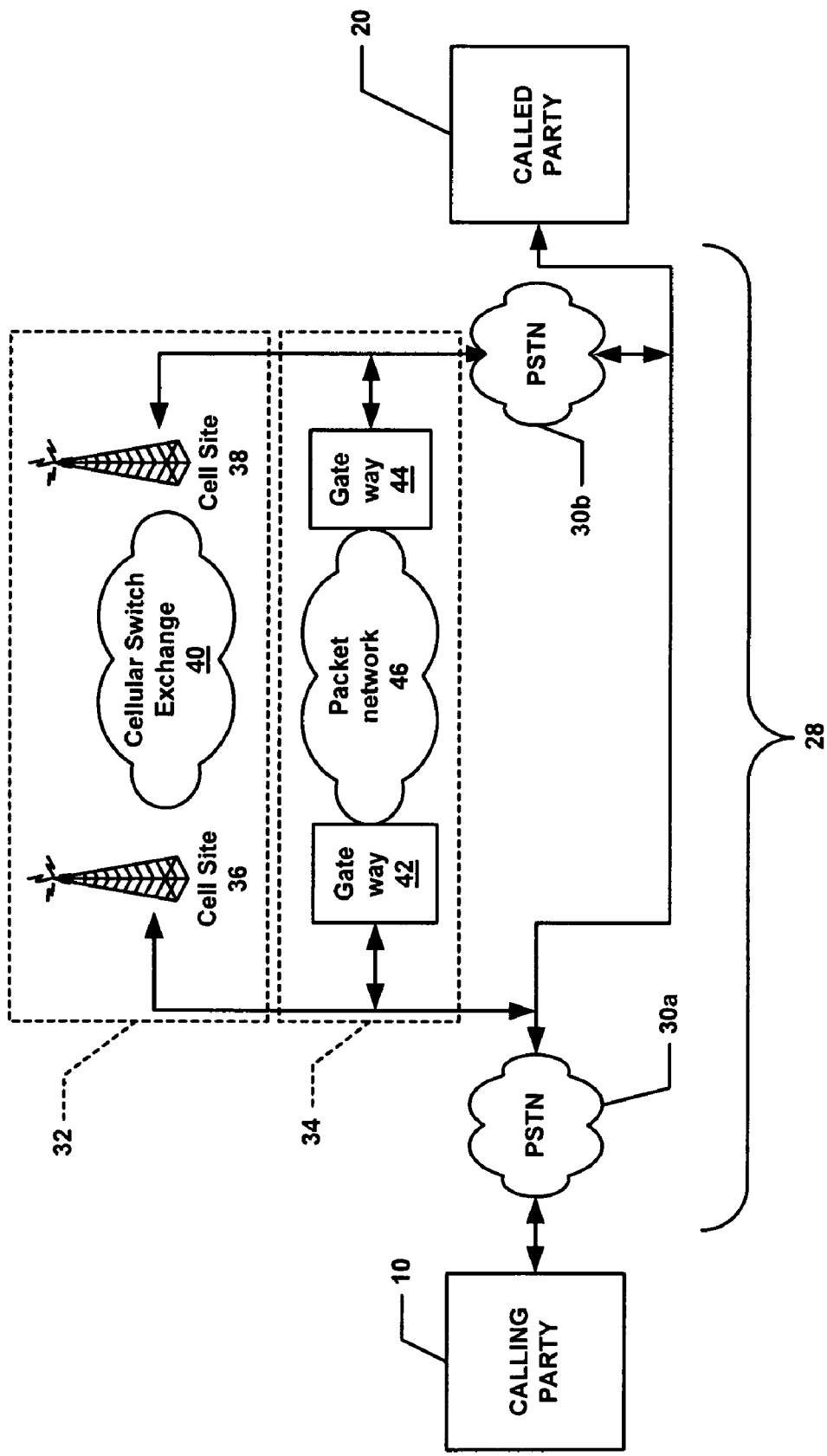
- FIG. 1 depicts a block diagram of a telephone system useful for identifying a geographic location of a caller.

Caller ID (Caller Identification or CID) is a telephony intelligent network service that transmits the caller's telephone number, and in some places the caller's name, to the called party's telephone equipment during the ringing signal or when the call is being set up but before the call is answered. Typically, CID is transmitted digitally using Bell 202 modulation between the first and second rings. CID is usually helpful for tracing down prank calls and telemarketers.

Caller ID is also known as Calling Line Identification (CLI) when provided via an ISDN connection to a PABX, while in some countries, the terms Caller Display, Calling Line Identification Presentation (CLIP), Call capture, or just Calling Line Identity (CLID) are used. CID originated with automatic number identification (ANI) in the U.S. Caller ID is made up of two separate entities: the calling number and the billing (or subscriber) name. When a phone switch sends out a number, the remote telephone company is responsible for looking up the name of the subscriber in a common database. Additionally, nothing ensures that the number sent by a switch is the actual number where the call originated. It is very easy for a telephone switch to send any digit string it requests to the system. For example, if the originating PBX (say, from an office with an ISDN PRI line) sends out 2024561414 as the ANI, then the remote caller ID box will display the White House on the terminal device.

Subscribers can prevent their numbers from being displayed, or "blocked", by dialing a special code before making a call. In North America and some other regions, the code is *67, while the United Kingdom and Ireland use 141. This special code does not block the information from companies using Call capture technology. This means that equipment with Caller ID will simply display the word 'PRIVATE' or 'WITHHELD'. Alternatively, Caller ID can be blocked permanently, and can only be released on a call-by-call basis by dialing a special code (*82 in the U.S.). This is the case in some countries with people who choose not to be listed in the local telephone directory. Similarly, some countries have a service known as anonymous caller rejection, meaning that calls made from a line in which the subscriber's number is blocked, will not be accepted. Blocking of anonymous callers is also becoming a popular feature for caller ID subscribers on a case-by-case basis as well. Some telephone companies also route anonymous calls to a service which requires the caller to announce him or her self, and then requires the called party to accept or reject the call. Blocking the number is referred to as Calling Line Identification Restriction (CLIR). Emergency services will most likely be able to show the restricted number using a service called Calling Line Identification Restriction Override (CLIRO), or by using general ANI services.

Caller ID between different countries is often not transmitted, meaning that the equipment with Caller ID will simply display either 'UNAVAILABLE' or 'INTERNATIONAL'. However, Caller ID between countries is becoming more widely available, meaning that a telephone number in another country will be displayed, complete with the country calling code. This is usually the case with mobile phones, particularly when a subscriber is roaming overseas. However, the overseas number may recognizable to the called party. For example, a US number 1 646 555 1212 may be displayed in the UK as 0646 555 1212, instead of 001 646 555 1212.

Telemarketing organizations often block the display of their calling numbers. Some states and countries require telemarketers to display a contact number that can accept complaints, as the individual caller numbers may not be able to be called. Some callers have situations in which revealing the number being called from would invade their privacy or cause other problems (e.g., a battered woman's shelter).

The presently disclosed system and method of identifying geographic location for the source of a call provides the geographic location of the calling party based on the area code and/or exchange of the call, while still respecting the privacy concerns of the party initiating the call. Enhancements to the basic idea are also possible. For example, the called party's telephone could have a list of geographic locations where contacts are known. Similarly, a list of locations where undesirable calls originate from could be stored in the called party's device. Called party's are frequently exposed to SPAM calls and/or FAX transmissions and the location could be useful in preventing re-occurring intrusion by such calls. With a simple interface, such as is present on MS Outlook for email, the user could add a geographic region to the approved or rejected regions to alert the called party about potentially valuable or spurious calls. Further, the combination of the time and the geographic area could provide potentially valuable information about the urgency of a call. For example a call from a geographic region where a family member lives at an unusual time could represent an emergency call. While this idea is most easily implemented within the structure of a Plain Old Telephone System (POTs), location proposals to solve the 911 problem for VoIP are likely to make this valuable in a VoIP parlence as well. This is especially true because SPAM over IP Telephony (SPIT) is a growing problem.

In one embodiment, the calling party would dial the digits and the receiving Central Office (CO) would know the calling party's phone number. Even in a case of that calling party suppressing the ICLID information, the CO could look up the area code and prefix and forward the location to the called party's ICLID display without violating the called party's right to anonymity.

Referring now to FIG. 1, an environment for placing and receiving telephone calls is shown. The communications between the calling party 10 at a first geographic location and the called party 20 at a second location is performed over a communications network 28. Communications network 28 includes a PSTN (including PSTN 30a and PSTN 30b) and may further include one or more of a cellular network 32 and a VOIP network 34.

The calling party 10 initiates a call over the communications network 28 to the called party 20. The call is generated by the calling party 10 which is then transmitted over the communications network 28, which may include a cellular network 32 and/or a VOIP network 34 and a PSTN 30a and 30b then to the called party 20.

The cellular network 32 comprises a first cell site 36, a second cell site 38 and a cellular switch exchange 40. Communications can occur bidirectionally through the cellular network 32. The call from the calling party 10 enters the PSTN 30*a*, may then go to first cell site 36, through cellular switch exchange 40 to second cell site 38, to PSTN 30*b*, then to the called party 20.

The VOIP network 34 comprises a first gateway 42, a packet network 46 (e.g., the Internet or an intranet) and a second gateway 44. Communications can occur bidirectionally through the VOIP network 34 as well. The call from the calling party 10 enters the PSTN 30*a*, may then go to first gateway 42, through packet network 46 to second gateway 42, to PSTN 30*b*, then to the called party 20.

The call from the calling party 10 may traverse the PSTN and either or both of VOIP network 34 and cellular network 32, and the return audio signal may traverse either or both of VOIP network 34 and cellular network 32 to the PSTN 30.

When the calling party 10 initiates the call, it sends the number of the called party through PSTN 30*a* wherein it is directed to PBX 30*b*. The remote telephone company (the central office of PSTN 30*b*) is responsible for looking up the name of the subscriber in the calling number. By way of the present invention, rather than forwarding the caller ID information, the Central Office of PSTN 30*b* would determine the geographic location of the calling party (from the area code and/or prefix associated with the calling party 10) and provide this geographical information to the called party 20. The geographic location includes, for example, a city and/or state of the calling party. The geographic information may also include a name of the calling party when the calling party is not a residence (i.e., a business such as Avaya Corp., Colorado).

The geographic information can be provided as a service offered to subscribers. The Central Office would determine if the called party is a subscriber to the geographical location information service. The geographic location information would be provided to the called party only if the called party was a subscriber to the information service, and when the called party was not a subscriber to the geographic information service, the Central Office would refrain from providing the geographic location information of the calling party to the called party.

The geographic location information service could also only be provided when the calling party has blocked the caller ID function. When caller ID has not been blocked, then there would be no need to provide the geographic location information.

The present invention has additional applications in VOIP phones and cellular phone environments. When using a VOIP phone or a cellular phone, the phone number assigned to the phone is displayed as the caller ID of the called party, regardless of the location of the calling party. In these types of applications, the geographic location may be determined as the location of the cell site or gateway first used by the calling party in placing the call. By providing geographic location information based on the actual location of the calling party, instead of the assigned number, more useful information is phones or VOIP phones).

Figure 2:
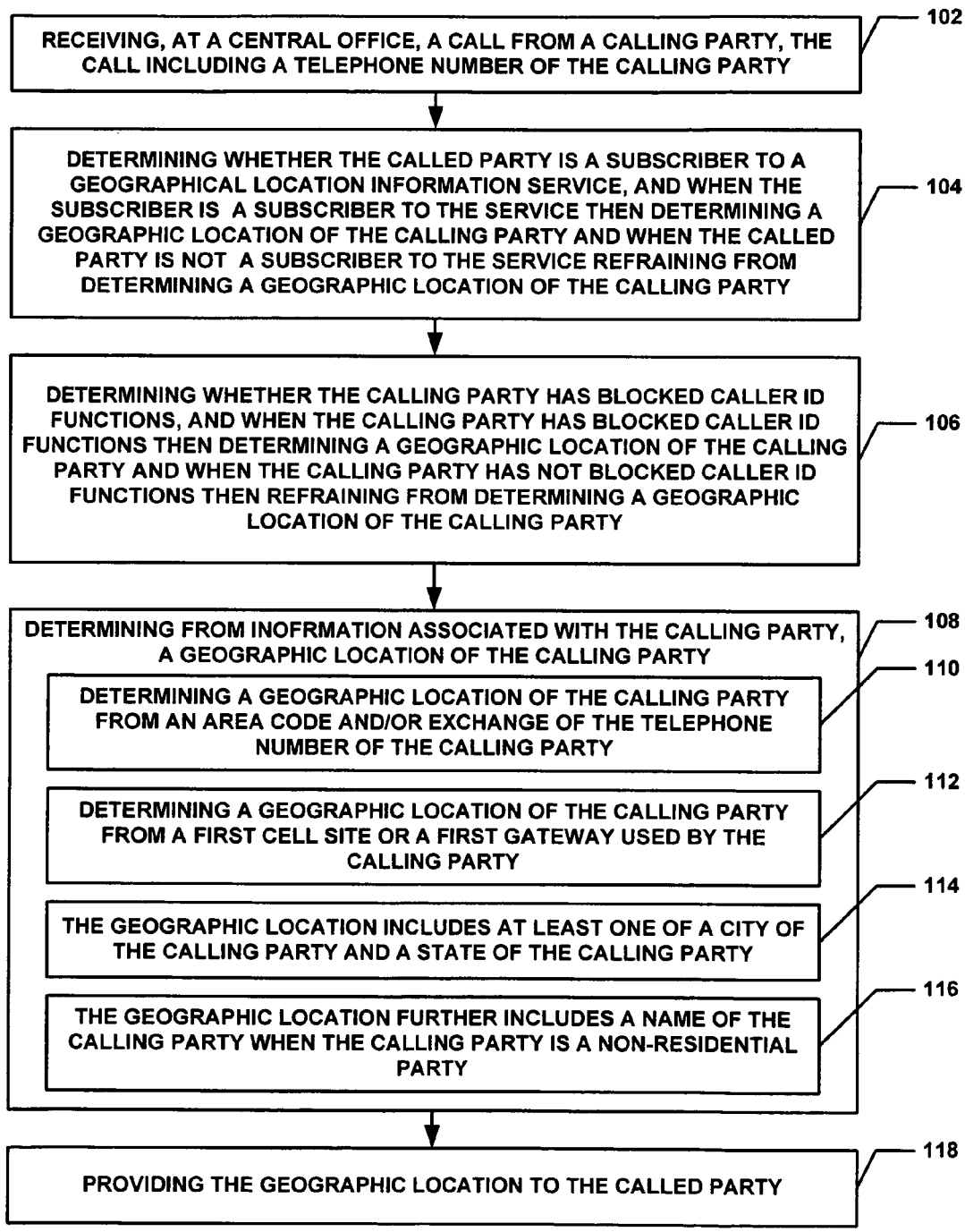
FIG. 2 shows a flow diagram of a particular embodiment of a method of identifying a geographic location of a caller.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 100 begins with processing block 102 which discloses receiving, at a central office, a call from a calling party, the call including a telephone number of the calling party.

Processing block 104 states prior to the determining a geographic location of the calling party, determining whether the called party is a subscriber to a geographic location information service, and when the called party is a subscriber to the service then determining a geographic location of the calling party and when the called party is not a subscriber to the service refraining from performing the determining a geographic location of the calling party. This would also include refraining from providing the geographic location to the called party.

Processing block 106 recites prior to the determining a geographic location of the calling party, determining whether the calling party has blocked caller ID functions, and when the calling party has blocked caller ID functions then determining a geographic location of the calling party and when the calling party has not blocked caller ID functions then refraining from performing the determining a geographic location of the calling party. This would also include refraining from performing the providing the geographic location to the called party.

Processing block 108 discloses determining from information associated with the calling party, a geographic location of the calling party. As shown in processing block 110 this may include determining a geographic location of the calling party from an area code and/or exchange of the telephone number of the calling party. As further shown in processing block 112 the determining a geographic location of the calling party comprises determining a geographic location of the calling party from a cell site or gateway first used by the calling party. Processing block 114 discloses that the geographic location includes at least one of a city of the calling party and a state of the calling party. Processing block 116 recites the geographic location further includes a name of the calling party when the calling party is a non-residential party.

Processing continues with processing block 118 which states providing the geographic location to the called party. Thus, the geographic location is provided, presenting an indication of who the calling party may be, while still protecting the privacy of the calling party.

Figure 3:
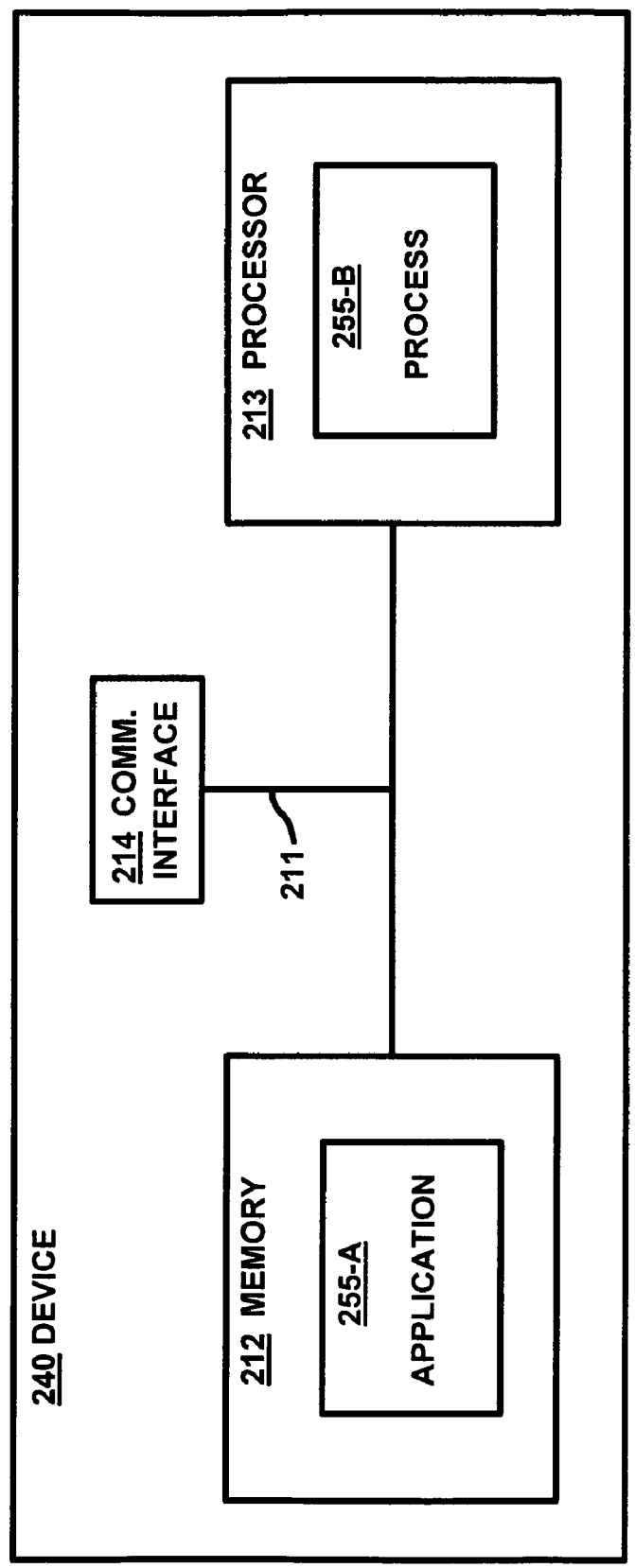
FIG. 3 illustrates an example computer system architecture for a central office computer system which identifies a geographic location of a caller in accordance with embodiments of the invention.

FIG. 3 illustrates example architectures of a Central Office computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of identifying a geographic location for a source of a call, the method comprising:
   receiving, at a central office, a call from a calling party, said call including a telephone number of the calling party;
   determining from information associated with the calling party, a geographic location of the calling party, wherein said determining a geographic location of the calling party comprises determining a geographic location of the calling party from at least one of a first cell site and a first gateway used by the calling party;
   providing said geographic location to the called party
   maintaining a collection of geographic locations where undesirable calls originate from; and
   rejecting calls that originate from a geographic location included in said collection of geographic locations where undesirable calls originate from.

2. The method of claim 1 wherein said determining a geographic location of the calling party comprises determining a geographic location of the calling party from at least one of an area code of said telephone number of the calling party and an exchange of said telephone number of the calling party.

3. The method if claim 1 wherein, prior to said determining a geographic location of the calling party, determining whether the called party is a subscriber to a geographical location information service, and when the called party is a subscriber to the service then determining a geographic location of the calling party and when the called party is not a subscriber to the service refraining from performing said determining a geographic location of the calling party and refraining from performing said providing said geographic location to the called party.

4. The method if claim 1 wherein, prior to said determining a geographic location of the calling party, determining whether the calling party has blocked caller ID functions, and when the calling party has blocked caller ID functions then determining a geographic location of the calling party and when the calling party has not blocked caller ID functions then refraining from performing said determining a geographic location of the calling party and refraining from performing said providing said geographic location to the called party.

5. The method of claim 1 wherein said geographic location includes at least one of a city of said calling party and a state of said calling party.

6. The method of claim 1 wherein said geographic location further includes a name of the calling party when the calling party is a non-residential party.

7. A non-transitory computer readable medium having computer readable code thereon for identifying a geographic location for a source of a call, the medium comprising:
   instructions for receiving, at a central office, a call from a calling party, said call including a telephone number of the calling party;
   instructions for determining from information associated with the calling party, a geographic location of the calling party, wherein said determining a geographic location of the calling party comprises determining a geographic location of the calling party from at least one of a first cell site and a first gateway used by the calling party;
   instructions for providing said geographic location to the called party;
   instructions for maintaining a collection of geographic locations where undesirable calls originate from; and
   instructions for rejecting calls that originate from a geographic location included in said collection of geographic locations where undesirable calls originate from.

8. The computer readable medium of claim 7 wherein said instructions for determining a geographic location of the calling party comprises instructions for determining a geographic location of the calling party from at least one of an area code of said telephone number of the calling party and an exchange of said telephone number of the calling party.

9. The computer readable medium if claim 7 further comprising instructions for, prior to said determining a geographic location of the calling party, determining whether the called party is a subscriber to a geographical location information service, and when the subscriber is a subscriber to the service then determining a geographic location of the calling party and when the called party is not a subscriber to the service refraining from performing said determining a geographic location of the calling party and refraining from performing said providing said geographic location to the called party.

10. The computer readable medium if claim 7 further comprising instructions for, prior to said determining a geographic location of the calling party, determining whether the calling party has blocked caller ID functions, and when the calling party has blocked caller ID functions then determining a geographic location of the calling party and when the calling party has not blocked caller ID functions then refraining from performing said determining a geographic location of the calling party and refraining from performing said providing said geographic location to the called party.

11. The computer readable medium of claim 7 further comprising instructions wherein said geographic location includes at least one of a city of said calling party and a state of said calling party.

12. The computer readable medium of claim 7 further comprising instructions wherein said geographic location further includes a name of the calling party when the calling party is a non-residential party.

13. A central office computer system comprising:
   a memory;
   a processor;
   a communications interface;
   an interconnection mechanism coupling the memory, the processor and the communications interface; and
   wherein the memory is encoded with an application that when performed on the processor, provides a process for identifying a geographic location for a source of a call, the process causing the central office computer system to be capable of performing the operations of:
   receiving, at a central office, a call from a calling party, said call including a telephone number of the calling party;
   determining from information associated with the calling party, a geographic location of the calling party, wherein said determining a geographic location of the calling party comprises determining a geographic location of the calling party from at least one of a first cell site and a first gateway used by the calling party;
   providing said geographic location to the called party;
   maintaining a collection of geographic locations where undesirable calls originate from; and
   rejecting calls that originate from a geographic location included in said collection of geographic locations where undesirable calls originate from.

14. The central office computer system of claim 13 wherein said determining a geographic location of the calling party comprises determining a geographic location of the calling party from at least one of an area code of said telephone number of the calling party and an exchange of said telephone number of the calling party.

15. The central office computer system if claim 13 wherein, prior to said determining a geographic location of the calling party, determining whether the called party is a subscriber to a geographical location information service, and when the subscriber is a subscriber to the service then determining a geographic location of the calling party and when the called party is not a subscriber to the service refraining from performing said determining a geographic location of the calling party and refraining from performing said providing said geographic location to the called party.

16. The central office computer system if claim 13 wherein, prior to said determining a geographic location of the calling party, determining whether the calling party has blocked caller ID functions, and when the calling party has blocked caller ID functions then determining a geographic location of the calling party and when the calling party has not blocked caller ID functions then refraining from performing said determining a geographic location of the calling party and refraining from performing said providing said geographic location to the called party.

17. The central office computer system of claim 13 wherein said geographic location includes at least one of a city of said calling party and a state of said calling party.

18. The central office computer system of claim 13 wherein said geographic location further includes a name of the calling party when the calling party is a non-residential party.

19. The method of claim 1 wherein said geographic location of said caller is provide for emergency call services from calls originating from a cellular device or a Voice Over Internet Protocol (VOIP) device.

20. The computer readable medium of claim 7 wherein said geographic location of said caller is provide for emergency call services from calls originating from a cellular device or a Voice Over Internet Protocol (VOIP) device.

21. The computing system of claim 13 wherein said geographic location of said caller is provide for emergency call services from calls originating from a cellular device or a Voice Over Internet Protocol (VOIP) device.

* * * * *